US007815810B2

(12) United States Patent
Bhalchandra et al.

(10) Patent No.: US 7,815,810 B2
(45) Date of Patent: Oct. 19, 2010

(54) APPARATUS FOR DISINFECTION OF SEA WATER/SHIP'S BALLAST WATER AND A METHOD THEREOF

(75) Inventors: Pandit A. Bhalchandra, Mumbai (IN); Ranade V. Vinayak, Maharashtra (IN); Anil A. Chandrashekar, Goa (IN); Sawant S. Shivram, Goa (IN); Ilangovan Dandayudapani, Goa (IN); Madhan Rajachandran, Goa (IN); Pilarisetty V. Krishnamurthy, Goa (IN)

(73) Assignees: Council of Scientific and Industrial Research, New Delhi (IN); Mumbai University Institute of Chemical Technology, Mumbai (IN)

( * ) Notice: Subject to any disclaimer, the term of this patent is extended or adjusted under 35 U.S.C. 154(b) by 1194 days.

(21) Appl. No.: 11/377,810

(22) Filed: Mar. 15, 2006

(65) Prior Publication Data

US 2007/0102371 A1    May 10, 2007

(30) Foreign Application Priority Data

Nov. 8, 2005    (IN) .................... 2988/DEL/2005

(51) Int. Cl.
*C02F 1/34* (2006.01)
(52) U.S. Cl. .................... 210/748.01; 422/20; 422/39
(58) Field of Classification Search ............ 210/788, 210/787, 774, 739, 805, 90, 96.1, 175, 194, 210/416.1, 512.1; 422/20, 39
See application file for complete search history.

(56) References Cited

U.S. PATENT DOCUMENTS 7,585,416 B2 *    9/2009    Ranade et al. ............... 210/788

FOREIGN PATENT DOCUMENTS

JP    2005246198    9/2005

JP    2005271648    10/2005
WO    PCT/IN2005/000444    12/2005

OTHER PUBLICATIONS

Boylston, J.: "Ballast Water Management for the Control of Nonindigenous Species", Society of Naval Architects and Marine Engineers Transactions, vol. 104, Jan. 1996, pp. 391-417.

* cited by examiner

*Primary Examiner*—Walter D Griffin
*Assistant Examiner*—Cameron J Allen
(74) *Attorney, Agent, or Firm*—Edwards Angell Palmer & Dodge LLP

(57) ABSTRACT

The invention disclosed provides an apparatus and method for disinfection of ship's ballast water, such as sea water, based on hydrodynamic cavitation. The apparatus comprises a cavitating chamber of cross section such as circular or non circular shape housing a single or multiple cavitating element(s) in the form of plates of metallic, ceramic, plastic materials of varying thicknesses placed perpendicular to the direction of flow of liquid and positioned at uniform or non-uniform spacing. The cavitating elements are provided with single or multiple orifices of different cross sections, circular or non-circular, with or without sharp edges and with a fraction of cross-sectional open area of the passage. The disinfected water may be re-circulated through the system for additional disinfection or released from the tank into the surrounding waterways. The disinfection of seawater/ship's ballast water is achieved by hydrodynamic cavitation and the method does not involve use of any chemicals or any chemical reaction. The invented apparatus and method is simple, eco-friendly and can be fitted on to existing intake and discharge systems of any ship with minor modifications. It poses no risk to the health of the ship's crew unlike chemical methods and requires no special skill or additional manpower for its operation. The apparatus and method is capable of effectively sterilizing hazardous organisms contained in ballast water stored in a ballast tank.

17 Claims, 8 Drawing Sheets

3(a)　　　　　　　　　　　　　3(b)

3(c)　　　　　　　　　　　　　3(d)

Collapse Pressure: 131 atm, Collapse Temperature: 1137 K, Critical radius: 4.1 microns

APPARATUS FOR DISINFECTION OF SEA WATER/SHIP'S BALLAST WATER AND A METHOD THEREOF

CROSS REFERENCE TO RELATED APPLICATIONS

This application claims the benefit of priority from Indian Patent Application No. 2988/Del/2005, filed Nov. 8, 2005.

FIELD OF THE INVENTION

The present invention relates to an apparatus for disinfection of sea water/ship's ballast water and a method thereof. The present invention particularly relates to an apparatus and method for disinfection of ship's ballast water, such as sea water, based on hydrodynamic cavitation. This apparatus and method of the present invention for sea water treatment have particular utility in a ship to treat ship's ballast water that is being transported from one region to another. The apparatus and method of the present invention may find other uses, such as making potable drinking water from contaminated water.

When a ship leaves a port empty, or partially loaded, it takes seawater into ballast tanks to maintain stability and adjust buoyancy. In virtually every case, this ballast water will contain living organisms. When the ship reaches its destination and prepares to load its cargo, it discharges this ballast water, thus introducing potentially invasive species to the aquatic environment of the destination port. Approximately 70,000 cargo vessels carry billions of tons of ballast water around the world annually. This introduces hundreds of marine invasive species to non-native environments. This form of environmental pollution brings about ecological imbalance and causes indeterminate damages, estimated to be in billions of dollars.

To address this issue, many countries have passed regulations governing ballast water treatment and management. The International Maritime Organization (IMO) has adopted a convention for the control and management of ship's ballast water and sediments. The IMO convention has set guidelines, pending ratification, for the quality of ballast water that can be discharged at any location. A variety of options are under consideration for the treatment/disinfection of ballast water in maritime vessels. The present invention specifically uses hydrodynamic cavitation for ballast water treatment.

Cavitation is a phenomenon of formation, growth and collapse of micro bubbles within a liquid. In hydrodynamic cavitation, the pressure variation in the flowing liquid causes cavitation. The momentum balance equation predicts that when a fluid is made to pass through a constriction, the static pressure downstream drops due to an increase in liquid velocity. If the pressure falls below a critical value, usually below the vapor pressure of the medium at operating temperature, then small bubbles or vapor cavities are formed in the fluid. The condition at which these fine bubbles can be produced is termed as cavitation inception. An increase in the velocity will result in a further drop in pressure and an increase in the cavitation intensity. Generally, pressure recovery takes place further downstream where these cavities collapse generating a high magnitude pressure pulse. If the gas content inside the cavity is small enough, the pressure impulse could be very high, of the order of several hundreds of bars, which is enough to rupture microbial cells causing its destruction. Asymmetric collapse of cavities also results in very high speed liquid jets. Shear rates around such jets is adequate to kill micro-organisms. The present invention harnesses the phenomena of hydrodynamic cavitation using a novel apparatus and method to treat ballast water. Such treatment limits the environmentally hazardous effects that may result from current practices.

The use of water treatment apparatuses and methods are known in the prior art. For example, U.S. Pat. No. 6,840,983 to McNulty describes a system and method of water treatment using a venturi injector for removal of dissolved oxygen from water. However, the focus is more on oxygen removal for corrosion inhibition and less on removing micro-organisms. The disclosed system is not effective for killing the microorganisms in the ballast water to the desired level.

Reference may be made to U.S. Pat. No. 6,835,307 and Australian patent no. 6497400, which describe thermal treatment for ballast water. The treatment does not use cavitation or chemicals for treating ballast water. The system is not effective for killing the micro-organisms in the ballast water to the desired level.

Another reference may be made to U.S. Pat. No. 6,773,607, wherein is described systems and methods for annihilating non-indigenous marine species and pathogenic bacteria in ship ballast water. These methods rely on adding a killing agent which needs to be stored on board. However, chemical disinfection techniques suffer from disadvantages like formation of possibly carcinogenic byproducts.

Reference may be made to a similar U.S. Pat. No. 6,773,611, in which apparatuses and methods of a ballast water treatment system are disclosed which includes a control system and a ballast tank system. This method is also based on adding biocides for treating ballast water and therefore requires production and storage of hazardous chemicals on board besides generating undesirable byproducts.

A ballast water treatment based on ultra sound cavitation is disclosed in the U.S. Pat. No. 6,770,248. The treatment requires piezoelectric rings immersed in pressurized transmission medium. Besides these requirements, the penetration of ultrasonic cavitation is small and its performance deteriorates with the scale-up. The method fails to use more effective hydrodynamic cavitation.

Reference may also be made to U.S. Pat. No. 6,761,123, which discloses a method for killing of aquatic nuisance species (ANS) in ship's ballast water by permeating to equilibrium a gaseous mixture. The method is time consuming and requires a vacuum over a long period (few days). This severely limits its utility for treating ballast water on ships.

A further reference may be drawn to U.S. Pat. Nos. 6,516,738, 6,125,778, 20020066399 A1 and 20030015481 A1 and PCT patent no. WO0210076, which describe methods for ballast water treatment using Ozone. The systems require generation and storage of Ozone on board. The systems do not use cavitation. The methods do not allow ballast water treatment without the occurrence of chemical reactions.

In U.S. Pat. Nos. 6,500,345, 2003029811 and 20050016933; PCT patent nos. WO2004002895 A2, WO02072478 A2 and WO0244089 A2, are described apparatuses and methods for treating ballast water using UV or chemical biocides or killing agents. Efficiency of UV based system degrades with scale of operation. The use of chemical biocides is undesirable due to hazards in storage and formation of by-products. The method does not allow ballast water treatment without the occurrence of chemical reaction.

A European patent EP1517860 and an US patent 2004055966 describe methods that involve filtration of water through membrane filter followed by UV radiation, which has certain limitations in achieving the required efficiency in eliminating organisms as well as filtration rate.

In U.S. Pat. Nos. 6,284,793, 2004129645, 2004099608 and 2005016933 A1 and a PCT patent no. WO2005061388, are described methods, that are based on chemical treatment. In this method, the organisms are destroyed by the addition of per carboxylic acid, hydrogen peroxide, ionization gases, chlorine dioxide and cyanide. The method relies on several toxic and hazardous chemicals. The method does not allow ballast water treatment without the occurrence of chemical reaction.

Reference may be made to U.S. Pat. No. 6,171,508, which describes a method and apparatus for treating ship ballast water based on oxygenations and de-oxygenation. Oxygenation and de-oxygenation steps are based on mass transfer equipment and are significantly more time consuming and expensive.

In U.S. Pat. No. 5,816,181 ballast water treatment using heating is disclosed. The method is based on use of multiple heat exchangers. Such heat exchangers require significant space and the disinfection using heating is rather expensive. The efficacy of the heat treatment is not as high as other methods of disinfection based on chemical biocides or hydrodynamic cavitation.

U.S. Pat. No. 5,192,451 discloses a method for controlling zebra mussels in ship ballast tanks by adding a water-soluble dialkyl diallyl quaternary ammonium polymer. However, the method does not allow ballast water treatment without the occurrence of chemical reaction and does not use hydrodynamic cavitation.

Besides the abovementioned patents, several studies on ultrasonic and hydrodynamic cavitation have been published in scientific journals, such as for example, Moholkar and Pandit, 1997; Gogate and Pandit, 2001 and references cited therein. The focus of these studies was mainly on developing basic understanding of cavitation phenomena and to explore new applications of cavitation. None of these studies however dealt with use of hydrodynamic cavitation for disinfection of ballast water.

While the above described hitherto known prior art inventions and studies fulfill their particular objectives and requirements, these do not describe a system and method for ballast water treatment which allows a vessel to disinfect ballast water that is being transported from one port area to another without using chemicals, UV or ultrasound. Therefore there is a definite need for developing a novel and more efficient disinfection technology, which could eliminate or reduce the use of disinfecting chemicals and also is not based on the use of UV or ultrasound.

OBJECT OF INVENTION

The main object of the present invention is to provide an apparatus for disinfection of sea water/ship's ballast water and a method thereof, which obviates the drawbacks of the hitherto known prior art, and not only has the advantages of the hitherto known prior art water treatment apparatuses and methods, but also provides additional advantages.

Another object of the present invention is to provide an apparatus for disinfection of sea water/ship's ballast water and a method thereof, which is based on the principle of hydrodynamic cavitation and is comprised of cavitating elements in a cavitation chamber, thus enabling more efficient and more suitable disinfection method for ballast water. This will make available an economically favorable and efficient manner by which to limit the environmentally adverse effects that may result when untreated ballast water is released into an environment that is ecologically different from that in which the water was originally obtained.

Yet another object of the present invention is to provide an apparatus for disinfection of sea water/ship's ballast water and a method thereof, wherein ballast water preferably but optionally, is passed through a cavitation chamber having one or a series of cavitating elements, wherein the gap between subsequent cavitating elements is in the range of 4 to 100 times the holding chamber diameters.

Still another object of the present invention is to provide a system and method of water treatment by circulating the ballast water preferably but optionally, through a single cavitating element or a series of cavitating elements for multiple times. The number of re-circulations needs to be optimized following the procedure discussed later. This makes it possible to efficiently treat water, preferably but optionally ballast water.

Still yet another object of the present invention is to provide an apparatus for disinfection of sea water/ship's ballast water and a method thereof, wherein the ballast water preferably but optionally, is circulated for multiple times through a cavitation chamber having a single or a series of cavitating elements.

A further object of the present invention is to provide an apparatus for disinfection of sea water/ship's ballast water and a method thereof, wherein the ballast water is pre-heated using the exhaust gases of the ship's engine, prior to feeding it to the cavitation chamber.

A still further object of the present invention is to provide an apparatus for disinfection of sea water/ship's ballast water and a method thereof, preferably for but not limited to the purposes of killing aquatic organisms.

A yet further object of the present invention is to provide an apparatus for disinfection of sea water/ship's ballast water and a method thereof, which is new, improved and eco-friendly and may be easily and efficiently manufactured, marketed and can be retrofitted with minor modifications in the ships, which are in service.

Another object of the present invention is to provide an apparatus for disinfection of sea water/ship's ballast water and a method thereof, that requires minimum installation area on board and has relatively low cost of manufacture with regard to both materials and labor, and which then can be made available to the user industries at relatively low prices.

The present invention provides an apparatus for disinfection of sea water/ship's ballast water and a method thereof. To achieve this, the present invention comprises a system for ballast water treatment having a cavitating chamber, which houses single or multiple cavitating elements having multiple orifices. The chamber having an inlet port that is adapted to receive ballast water and an outlet port that is adapted to expel the treated ballast water. Water to be treated, optionally preheated, enters the inlet port and passes through the cavitating chamber comprising cavitating elements wherein hydrodynamic cavitation occurs which effectively disinfects the ballast water. The disinfected ballast water is then expelled through the outlet port to a receptacle, which is preferably but optionally a ballast tank. The method for ballast water treatment may further comprise re-circulating said water through the cavitation chamber to provide further disinfection and may also include re-treating the water before releasing the water to the surrounding waterways from the receptacle, which is preferably but optionally a ballast tank, or alternatively, but not exclusively, a closed tank or a water conduit connecting to surrounding waterways.

As such, the general purpose of the present invention, which will be described subsequently in greater detail, is to provide an apparatus for disinfection of sea water/ship's ballast water and a method thereof which has all the advantages of the prior art mentioned heretofore and many novel features that result in a system and method for ballast water treatment which is not anticipated, rendered obvious, suggested, or even implied by the prior art, either alone or in any combination thereof.

The ballast water is passed through cavitation chamber comprising cavitating elements. This may be achieved while ballasting and de-ballasting. Preferably but optionally, the cavitating chamber containing the cavitating elements are connected in series to a transfer piping through which ballast tanks receive or expel water. A pump means, preferably but optionally a ballast pump as found on many ships is adapted to receive water from an external water source and may pump water through the cavitating chamber.

The system may also include a re-circulation means that takes water in the receptacle and re-circulates the water from the receptacle via a re-circulation piping means and re-pumps the water through the cavitating chamber back into the receptacle. This re-circulation means, optionally but preferably, is monitored for the level of micro-organisms present in the treated water. There are, of course, additional features of the invention that will be described hereinafter.

The numerous objects and advantages of the present invention will be readily apparent to those of ordinary skill in the art upon a reading of the following detailed description of presently preferred, but nonetheless illustrative, embodiments of the present invention when taken in conjunction with the accompanying drawings. It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

There thus has been outlined broadly the more important features of the invention in order that the detailed description thereof that follows may be better understood and in order that the present contribution to the art may be better appreciated.

The objects of the invention as outlined herein above, along with the various features of novelty that characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated current embodiments of the invention.

The apparatus for disinfection of sea water/ship's ballast water and a method thereof of the present invention has been illustrated in FIGS. 1 to 6 of the drawings accompanying this specification.

FIG. 1 of the drawings accompanying this specification represents a process flow diagram of the current embodiment of the system and method of ballast water treatment constructed in accordance with the principles of the present invention, wherein:

| | |
|---|---|
| 17 | Ballast water intake source |
| 18 | Intake pump |
| 3 & 10 | Pressure gauges |
| 4 & 11 | Heat exchangers |
| 5 & 12 | Cavitation chambers |
| 6 & 13 | Quality control checks |
| 7, 14 & 15 | ⅔ way flow diversion valves |
| 8 | Ballast tank |
| 9 | Discharge pump |
| 16 | Heat source |

FIG. 2 represents a drawing showing cross section of a cavitating chamber, which forms the main component of the proposed invention and is one of the embodiments of the method and apparatus for the ballast water treatment which can be installed in a ship, wherein:

| | |
|---|---|
| 1 | Flanges |
| 2 | Cavitating elements |

Figure 4:
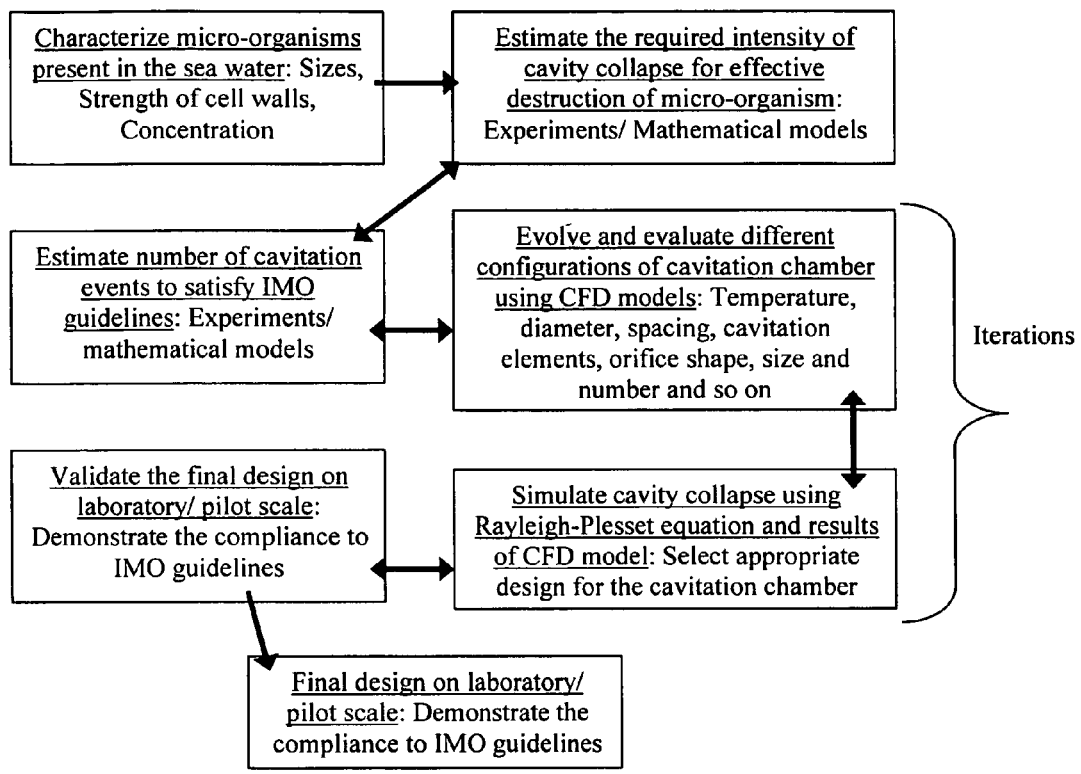
FIG. 4 represents a flow chart of methodology used for designing and optimizing the method and the apparatus for disinfection of sea/ballast water proposed in this invention. The more detailed flow chart of 4$^{th}$ box in FIG. 4 is shown in FIG. 7, wherein is given the methodology of applying CFD for optimizing design of dis-infector.
Figure 5:
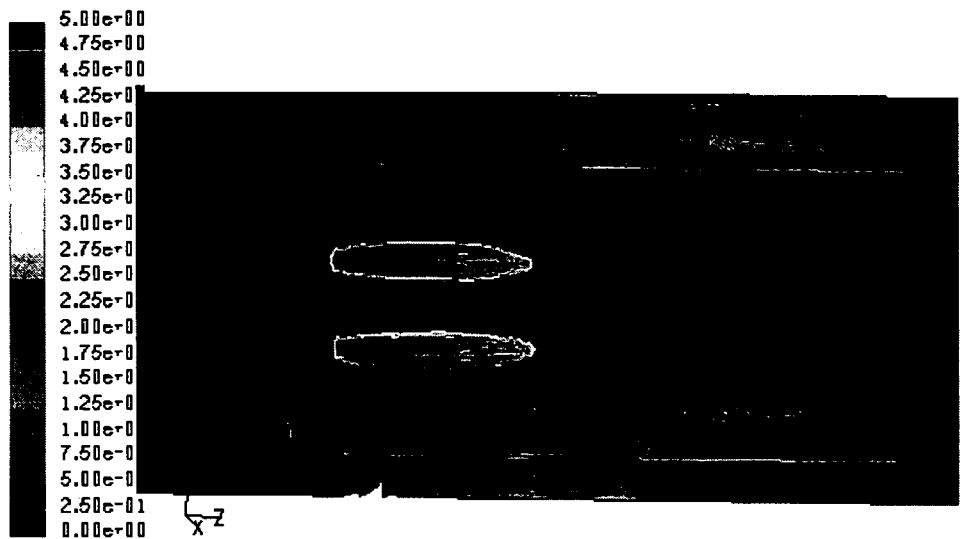
Figure 5:
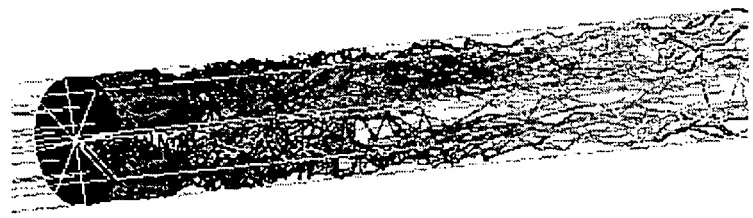
Figure 5:
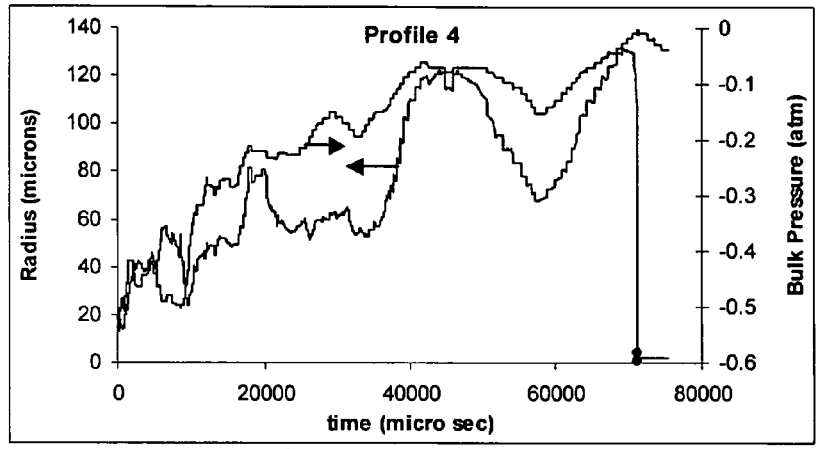
Figure 5:
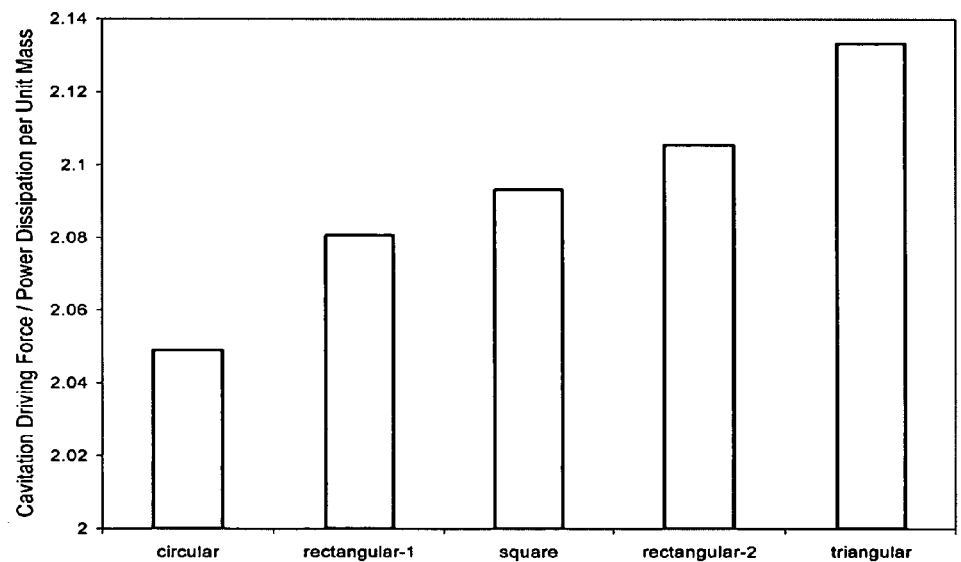

FIG. 5 of the drawings shows a sample of results obtained using the methodology depicted in FIG. 4. FIG. 5 represents influence of fractional open area, hydraulic diameter and operating pressure on disinfection performance of one of the embodiments of the present invention.

Figure 6:
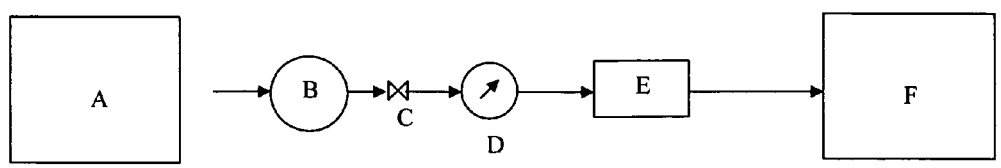

FIG. 6 shows a schematic of an experimental system used to verify the invented method and apparatus for the disinfection of sea water proposed in the present invention, wherein:

| | |
|---|---|
| A | Challenge water tank |
| B | Pump |
| C | Flow regulating valve |
| D | Pressure gauge |
| E | Cavitation chamber |
| F | Collection tank |

Figure 7:
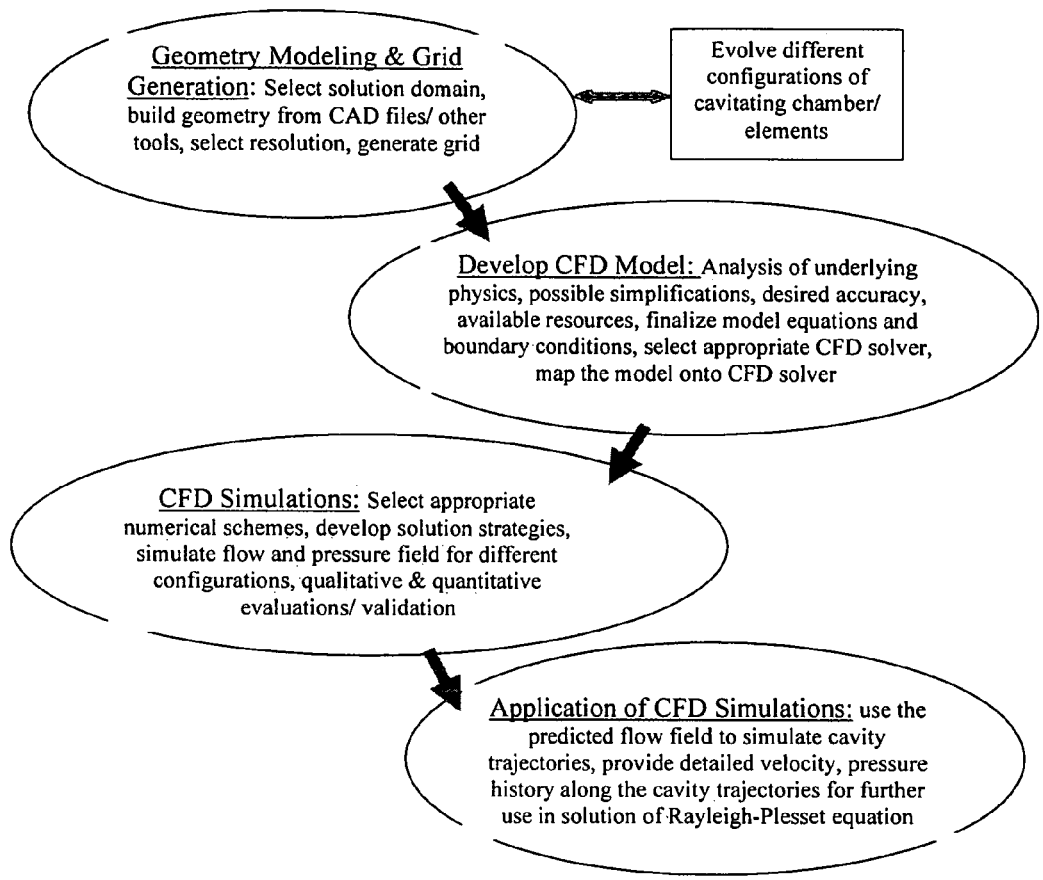

FIG. 7 shows the stepwise procedure of CFD (computational fluid dynamics) modeling to quantify cavitation in selected geometry of cavitation chamber/element for given operating condition. This involves creating the geometry of the cavitation chamber/ element, discretizing it and solving momentum and turbulence equations to get flow parameters. These flow parameters are then used to simulate cavity dynamics to quantify cavitation in selected geometry.

Figure 1:
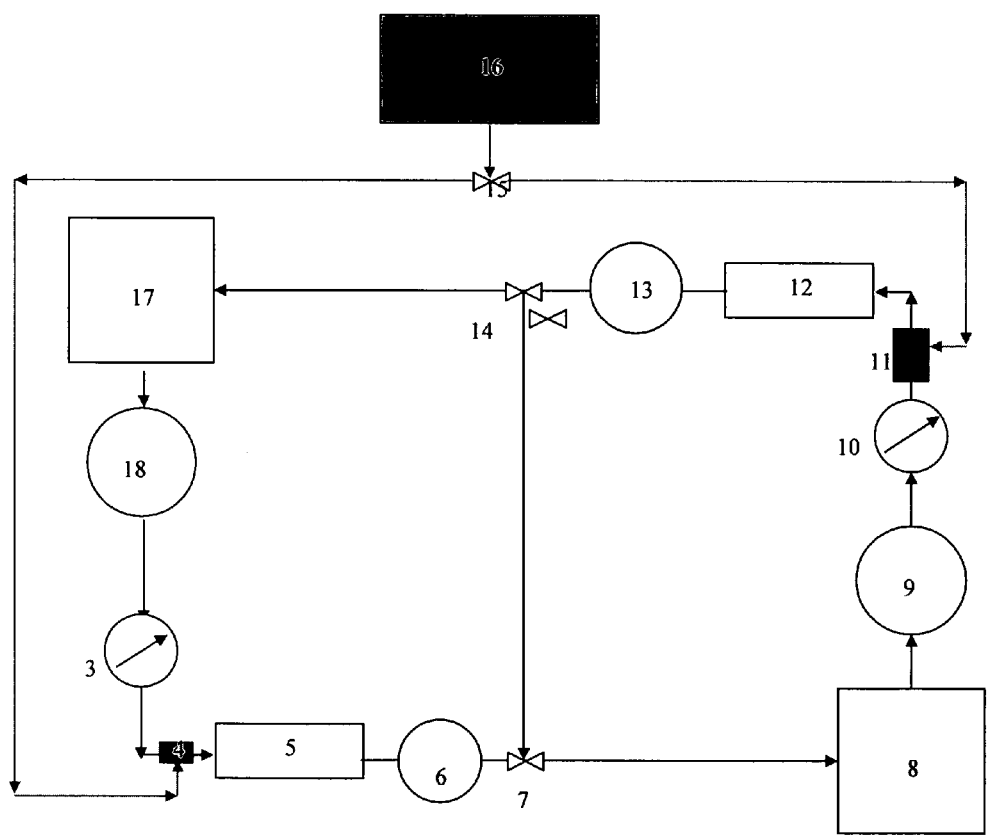

In FIG. 1 of the drawings is illustrated the basic flow diagram of the apparatus for disinfection of sea water/ship's ballast water and a method thereof of the present invention using hydrodynamic cavitation which allows a ship to treat water that is being transported from one port to another while ballasting and de-ballasting. More particularly, the system for ballast water treatment using a cavitation chamber (5) has water intake means (17) through which sea water enters from outside a vessel. The water is then pumped through a pump means, such as, but not limited to a ballast pump (18), into an inlet port on cavitation chamber (5) optionally through heat exchanger (4). The exhaust gases from the ships engine are used in this heat exchanger to manipulate the temperature of the ballast water entering the cavitation chamber (5). The cavitation chamber comprises a single or multiple cavitating elements comprising a single or multiple orifices. The shape of the orifices can either be circular or non-circular and either with or without sharp edges. The treated ballast water is pumped from the cavitation chamber (5) to the ship's ballast tank (8). A quality control check can be performed prior to the receptacle (8) with appropriate method to monitor the quality of the treated water. If necessary, the water or a portion thereof in the receptacle (8) may be re-circulated with the help of deballasting pump (9), through the cavitation chamber (12), and back into the receptacle (8) by diverting the flow with valves (7 & 14) as preferably but optionally determined by and/or controlled by the quality monitoring system. It should be noted that the method and the apparatus represented in FIG. 1 could be located on a ship or any seafaring liner.

Figure 2:
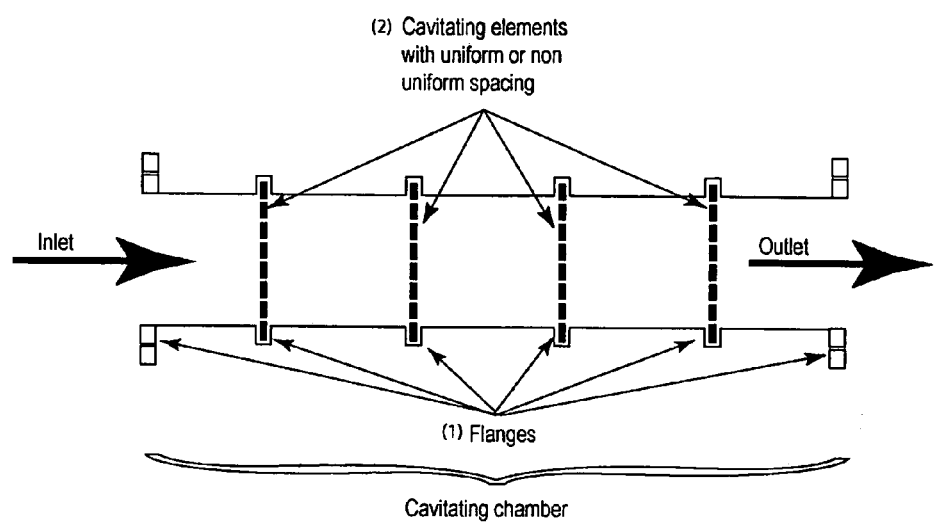

FIG. 2 represents a drawing showing cross section of cavitating chamber (item no. 5 & 12 in FIG. 1 and item E in FIG. 6) with details of arrangement of cavitating elements and inline connecting flanges. The cavitating chamber of circular, rectangular or of any other cross section shape comprises of a single or multiple cavitating elements (2) in the form of plates of metallic, ceramic or plastic materials of varying thicknesses placed perpendicular to the direction of flow of fluid and positioned at uniform or non-uniform spacing in the range of 4 to 100 times the holding chamber diameter. The cavitating elements are mounted and held in place by means of an appropriate mechanical holding device such as flanges (1). The cavitating elements (2) are provided with single or multiple orifices of different cross sections, such as circular, triangular, square or rectangular shape with or without sharp edges and with a fraction of cross-sectional open area of the passage. The orifices may be circular or non-circular as stated above with each hole having diameter in the range of 500 micrometers to few millimeters. The assembly of these cavitating elements is housed in a chamber which is having either circular or non circular cross section with appropriate flanges (1) as shown in FIG. 2 on intake and discharge ends to be housed in line.

Figure 3:
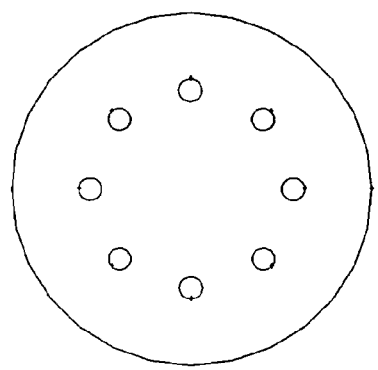
FIG. 3 depicts examples of cavitating elements proposed in the present invention of method and apparatus for disinfection of seawater/ship's ballast water treatment included therein.
Figure 3:
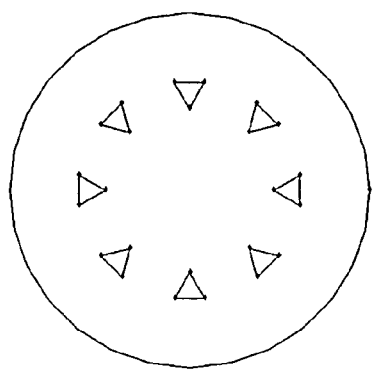
Figure 3:
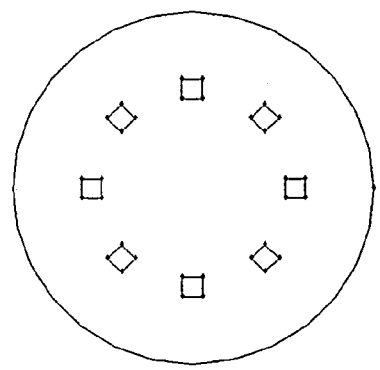
Figure 3:
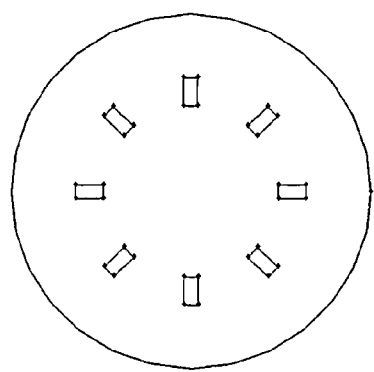

In FIG. 3 of the drawings is depicted examples of cavitation elements. As shown, percentage open area, number of orifices, distribution of locations of orifices and the shape and size of orifices are the key design and operating parameters. The cavitation chamber comprises a single or multiple cavitating elements comprising a single or multiple orifices. The shape of the orifices can either be circular or non-circular and either with or without sharp edges.

In FIG. 4 of the drawings is shown a flow chart of a procedure for designing a method and apparatus for meeting the ballast water treatment targets for any capacity. The method proposed in this invention involves solution of computational fluid dynamics (CFD) based models and Rayleigh-Plesset equation for cavitation collapse for identifying preferably but not limited to (i) diameter of cavitation chamber; (ii) number of cavitation elements; (iii) spacing between cavitation elements; (iv) fractional open area and number, diameter and distribution of orifices on each cavitation element; (v) operating temperature; (vi) operating flow rate; (vii) number of re-circulations through cavitation chamber. It should be noted that for ensuring the desired overall disinfection effectiveness, it is essential to design a system which generates right number of cavitation events of adequate intensity. The number of cavitation events is dependent on perimeter of cavitation elements. The intensity of cavitation events depend on percentage open area or in other words on pressure drop across cavitating elements. It should be noted that different micro-organisms would require different number density and intensity of cavitation events. Different cavitating elements can be fruitfully used in series or in parallel to optimize the overall system.

The overall methodology for design of desired sea water dis-infector is shown in FIG. 4. The methodology used for identification of the optimum operating parameters involves identification of type of microorganisms and estimating required intensity/number of cavitation events. The Rayleigh-Plesset equation is used to simulate cavity dynamics and to quantify collapse of cavities and resulting disinfection performance. Cavitation number ($C_v$) is an important parameter in hydrodynamic cavitation which decides the conditions for the onset of cavitation in a particular system. It can be expressed as:

$$C_v = \frac{p_2 - p_v}{\frac{1}{2}\rho_l v_o^2}. \tag{1}$$

where $p_2$ is recovery pressure, $p_v$ is the vapor pressure of liquid, $v_o$ is average velocity of liquid at the orifice and $\rho_l$ is the density of liquid. Under ideal conditions, cavitation preferably occurs for $C_v<1$ though under some conditions e.g. presence of gases/solid particles, cavitation may occur at $C_v>1$. Computational fluid dynamics (CFD) based models are used to simulate flow and to predict the instantaneous pressure field around the traveling cavity at any downstream location.

The CFD models involve solution of conservation equations of mass, momentum and energy on a digital computer for a specific design/configuration. The more detailed flow chart of $4^{th}$ box in FIG. 4 is shown in FIG. 7, wherein is given the methodology of applying CFD for optimizing design of dis-infector. The first step in CFD modeling is to model specific geometry of cavitation chamber/elements and generate grids for further computations. The next step is to select appropriate governing equations for solving the flow in cavitation chamber/elements. The flows relevant to cavitation are invariably turbulent. Several different models have been developed to simulate turbulent flows (see for example Ranade, 2002 and references cited therein). For simulating the flow through the cavitation chamber/elements relevant to the present invention, we used the standard k-□ model to simulate turbulence. The basic governing equations are as follows:

$$\nabla \cdot (\rho \overline{U}) = \sum_k \overline{S_i}$$

$$\frac{\partial}{\partial t}(\rho \overline{U}) + \nabla \cdot (\rho \overline{U}\overline{U} + \rho\overline{uu}) = -\nabla \overline{p} - \nabla \cdot \overline{\tau} + \rho g + \overline{F}$$

$$-\overline{\rho u_i u_j} = \mu_T \left(\frac{\partial U_i}{\partial x_j} + \frac{\partial U_j}{\partial x_i}\right) - \frac{2}{3}\delta_{ij}\left(\mu_T \frac{\partial U_k}{\partial x_k} + \rho k\right)$$

$$\mu_T = \frac{C_\mu \rho k^2}{\varepsilon}$$

$$\frac{\partial(\rho k)}{\partial t} + \frac{\partial(\rho U_i k)}{\partial x_i} = \frac{\partial}{\partial x_i}\left(\frac{\mu_T}{\sigma_k}\frac{\partial k}{\partial x_i}\right) + G - \rho\varepsilon$$

$$\frac{\partial(\rho \varepsilon)}{\partial t} + \frac{\partial(\rho U_i \varepsilon)}{\partial x_i} = \frac{\partial}{\partial x_i}\left(\frac{\mu_T}{\sigma_\varepsilon}\frac{\partial \varepsilon}{\partial x_i}\right) + \frac{\varepsilon}{k}(C_1 G - C_2 \rho\varepsilon)$$

$$G = \frac{1}{2}\mu_T\left[\nabla \overline{U} + (\nabla \overline{U})^T\right]^2$$

These equations were solved using finite volume method and SIMPLE algorithm (Patankar, 1972) using a commercial CFD solver, FLUENT (of Fluent Inc., USA). The geometry modeling was done using commercial software called GAMBIT (of Fluent Inc., USA). The computational model was evaluated to quantify errors associated with the numerical solution. After establishing that these numerical errors are within acceptable limits, the model was used to simulate flow and pressure field in different configurations of cavitation chamber/elements. The simulated trajectories of cavities and pressure/velocity history along such trajectories were stored for subsequent calculations of Rayleigh-Plesset equation. The fluctuating pressure field predicted by the CFD models is incorporated into a bubble dynamics equation to obtain the cavity radius history and the collapse pressures for a cavity of certain size, traveling with the fluid (see Pandit and Gogte, 2001; Ranade, 2002). Once the parameters for generating desired cavitation events are identified, CFD models are then used to optimize the overall configuration of cavitation chamber. The methodology is useful to optimize the overall system to meet the IMO guidelines on ballast water treatment.

FIG. 5 of the drawings shows a sample of results obtained using the methodology depicted in FIG. 4. FIG. 5(a) shows predicted flow field for one of the embodiments of the method and apparatus proposed in this invention. FIG. 5(b) shows simulated trajectories of cavities which might be generated in this embodiment. FIG. 5(c) shows simulated dynamics and its eventual collapse of a single cavity. FIG. 5(d) shows predicted relative driving force for different cavitation elements for the same power dissipation per unit mass.

The present invention provides an apparatus and method for disinfection of ship's ballast water, such as sea water, based on hydrodynamic cavitation. The apparatus comprises a cavitating chamber of cross section such as circular or non circular shape housing a single or multiple cavitating element(s) in the form of plates of metallic, ceramic, plastic materials of varying thicknesses placed perpendicular to the direction of flow of liquid and positioned at uniform or non-uniform spacing mounted and held in place by means such as flanges. The cavitating elements are provided with single or multiple orifices of different cross sections i.e. circular, triangular, square or rectangular shape with different ratios of length to width. with or without sharp edges and with a fraction of cross-sectional open area of the passage. The orifices may be circular or non-circular as stated above with each hole having diameter in the range of 500 micrometers to few millimeters.

Accordingly the present invention provides an apparatus for disinfection of sea water/ship's ballast water, which comprises a water intake means (17 & 18) consisting of a ballast water intake source (17) and a pump means (18) connected in series through a pressure gauge (3) and check valve(s) to an inlet port of a cavitation chamber (5), optionally through an heat exchanger (4), characterized in that the said cavitation chamber (5) essentially being provided with single or multiple cavitating elements (2) placed perpendicular to the direction of flow of fluid, said cavitating elements (2) being spaced at uniform or non-uniform spacing and each said cavitating element (2) having a fractional open area in the form of single or multiple orifices, the output of the said cavitation chamber (5) being passed through a quality check point (6) and check valve(s) (7) to a ballast tank (8), the output of the said ballast tank (8) being connected to a discharge pump (9) through check valve(s) to a discharge outlet.

In an embodiment of the present invention, the cavitation chamber (5) has water intake means (17 & 18) through which seawater enters from outside a vessel.

In another embodiment of the present invention, the pump means (18) is one or a series of pumps such as, but not limited to a ballast pump.

In yet another embodiment of the present invention, the heat exchanger (4) is connected to an energy source such as a standard source or method known in the art, or steam or engine exhaust gases from the ships engine.

In still another embodiment of the present invention, the cavitating chamber (5) is of cross section such as circular or non circular shape.

In still yet another embodiment of the present invention, the cavitating chamber (5) houses a single or multiple cavitating element(s) (2) in the form of plates such as of metallic, ceramic, plastic materials of varying thicknesses placed perpendicular to the direction of flow of fluid in series or in parallel and positioned at uniform or non-uniform spacing mounted and held in place by means such as flanges.

In a further embodiment of the present invention, the spacing between subsequent cavitating elements is in the range of 4 to 100 times the holding chamber diameters, spaced at uniform or non-uniform spacing.

In a still further embodiment of the present invention, the cavitating element is having a fraction of open area in the range of 0.01 to 0.90 times the holding chamber cross sectional flow area.

In a yet further embodiment of the present invention, the cavitating element(s) having a fractional open area in the form of single or multiple orifices are either circular or non-circular with or without sharp edges, wherein each hole is having diameter in the range of 500 micrometers to few millimeters.

In another embodiment of the present invention, (i) the diameter of cavitation chamber; (ii) the number of cavitation elements; (iii) the spacing between cavitation elements; (iv) the fractional open area and number, diameter and distribution of orifices on each cavitation element; (v) the operating temperature; (vi) the operating flow rate/flow velocity; (vii) the number of re-circulations through cavitation chamber; are estimated and configured using computational fluid dynamics (CFD) based models and Rayleigh-Plesset equation for cavitation collapse, such as herein described.

In a yet another embodiment of the present invention, the quality check point (6) is provided with known devices capable of monitoring the quality of treated water.

In a still another embodiment of the present invention, to enable re-circulation of the treated water or a portion thereof if required by the quality check point (6), the discharge outlet of the said discharge pump (9) being connected through a pressure gauge (10) and check valve(s), optionally through an heat exchanger (11), to an inlet port of a cavitation chamber (12) having single or multiple cavitating elements and back to the said ballast tank (8) through a quality check point (13) and check valves (14, 7).

Accordingly the present invention provides a method for disinfection of sea water/ship's ballast water using the apparatus as herein above described, which comprises subjecting the ballast water to be treated to hydrodynamic cavitation by pumping the water intake of sea water, optionally pre-heated, into an inlet port of a cavitation chamber having single or multiple cavitating elements, the treated ballast water being passed through a quality check point to a ballast tank, re-circulating the treated water or a portion thereof if required by the quality check, for further hydrodynamic cavitation.

In an embodiment of the present invention, the ballast water to be treated is optionally pre-heated to a temperature in the range of 10 to 70° C.

In another embodiment of the present invention, the water flow rate through the cavitating element is such that the liquid velocities are in the range of 2 to 150 m/s.

In still another embodiment of the present invention, the water pressure is in the range of 0.5 to 150 kg/cm$^2$.

In another embodiment of the present invention, the method for disinfection treatment of water using hydrodynamic cavitation is also suitable for a wide variety of water treatment applications including but not limited to wastewater management, agricultural applications, pool and space applications, oil and gas applications, and various disinfectant applications.

The ballast water disinfection treatment herein described preferably though not exclusively occurs such that as the ship pumps sea water through a cavitation chamber, which is preferably but not limited to a single or multiple cavitating elements. Generally, the pump means, which may be one or a series of pumps, draws seawater from waterways surrounding the ship into the transfer piping means. The pumped seawater is passed through preferably but not limited to a heat exchanger. The energy source to heat this water may be a standard source or method known in the art, such as steam or engine exhaust gas or other. Control of the cavitation chamber may be through a regulator connected in series with the water intake line means that is connected to the cavitation chamber. The treated water expelled from the cavitation chamber is connected to a receptacle or optionally receptacles, which is preferably but optionally a ballast tank(s).

The water treatment start-up and shut down will coincide with the vessel's water intake. A re-circulation mechanism may be employed to further treat water and the need for such may be determined by an appropriate quality check system. Though at present, no in-line monitoring sensors are available by which bacteria could be counted. However, elsewhere efforts are underway to devise sensors for detecting presence of specific pathogens. If a re-circulation mechanism needs to be activated, the shutdown operation, preferably although optionally, may be controlled by a control panel means. In use, it can now be understood the apparatus and method of water treatment may be used for a non-chemical, efficient treatment of water.

While an embodiment of the apparatus and method of water treatment of the present invention has been described in detail it should be apparent that modifications and variations thereto are possible, all of which fall within the true spirit and scope of the invention. With respect to the above description then, it is to be realized that the optimum dimensional relationships for the parts of the invention, the following procedure may be used.

The water pumping through the cavitation chamber gets disinfected due to hydrodynamic cavitation. Whenever water passes through the cavitation chamber, cavities are generated due to the pressure fluctuations resulting from the changes in the geometry encountered by the flow. The generated cavities undergo various stages of the cavitation phenomena before violently collapsing, resulting in the release of large magnitudes of energy and highly reactive oxidizing species. The oxidizing species and conditions of high temperature and pressure are considered responsible for the disinfection of the micro-organisms. The quantum of the oxidizing species and the magnitude of temperature/pressure, hence the disinfection efficiency, is dependent on the geometric and operating conditions.

It should be noted that, the optimum dimensional relationships for the parts of the invention to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

For example, any suitable cylindrical conduit made of a wide variety of metals, plastic, or other sturdy material may be used for the transfer piping means and/or re-circulation piping means described. And, although the disinfection treatment of water using hydrodynamic cavitation preferably but optionally on vessels, has been described, it should be appreciated that the method and the apparatus of water treatment herein described may also be suitable for a wide variety of water treatment applications including but not limited to wastewater management, agricultural applications, pool and space applications, oil and gas applications, and various disinfectant applications. Additionally, a wide variety of holds or tanks of many shapes and sizes, as well as an open body of water, also may be used instead of the basic receptacle or ballast tank described. Furthermore, the method, configuration, size, shape and pressure and volume requirements may be adapted to conform to a wide variety of ships of a variety of shapes and sizes, and a closed recirculation system and method described may be transferable from one receptacle to another. The invention may also be adapted for use with a wide variety of pumps, receptacles, cavitation elements or sources, pressure valves and other components that are required by the invention but already present in a vessel or other treatment location.

The novel apparatus and method of the present invention is capable of sterilizing hazardous organisms contained in ballast water stored in a ballast tank to effectively provide treatment of ballast water. The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The novelty of the present invention resides in the capability to provide a relatively low cost and eco-friendly apparatus and method based on hydrodynamic cavitation for efficient and economical disinfection of sea water/ship's ballast water by simply passing the organism infested water through single or multiple cavitation chambers housing single or multiple cavitating elements, without use of any chemicals or any chemical reaction.

The non-obvious inventive step of providing one or more cavitation chamber(s) housing single or multiple cavitating elements, spaced at uniform or non-uniform spacing and each element comprising a fractional open area in the form of single or multiple orifices of circular or non-circular shape with or without sharp edges, enables realization of the novelty of the apparatus of the present invention. Further, the non-obvious inventive step of subjecting the water to be treated to hydrodynamic cavitation enables realization of the novelty of the method of the present invention for disinfection of sea water/ship's ballast water.

In order to demonstrate the performance characteristics of the apparatus for disinfection of sea water/ship's ballast water and a method thereof of the present invention, an experimental set-up was constructed as shown in FIG. 6 of the drawings. Untreated challenge water from the sea enters the cavitation chamber (E) via a 7.5 HP centrifugal pump (B). Prior to forcing it through the cavitation chamber (E), the seawater is first collected into a shore tank (A) where it can be inoculated with phytoplankton and zooplankton culture raised in the laboratory. The water in the tank (A) is thoroughly mixed and evaluated for organisms' density including microorganisms. The water along with the mixture of organisms is forced through the inlet of cavitation chamber (E) comprising of a cavitation element with a single or multiple holes of diameter in the range of 1 to 21.5 mm diameter and fractional open area in the range of 0.2 to 0.9. The flow in the cavitation chamber (E) is controlled by means of a flow regulating valve (C). A pressure gauge (D) is fitted prior to cavitation chamber (E), meant for recording cavitation pressure of the fluid for different orifices. Post treated water from the outlet of cavitation chamber (E) is collected at the collection tank (F), and evaluated for the destruction level of the organisms.

The evaluation for the destruction level of the organisms is carried out as per the following procedure:

The biological count with regard to free living viable bacteria is assessed in the intake and discharge waters using spread plate method. Aliquot of water sample (0.1 ml) after serial dilutions is plated on Zobell marine agar and incubated for 24 hours at ambient temperature. The colonies are enumerated thereafter and expressed as number per milliliter. The bacterial count in discharge water (post-cavitation) is compared with the intake water (pre-cavitation) and the percentage reduction in bacterial number is calculated using the following formula:

$$\text{Percent reduction} = \frac{(I - D) \times 100}{I}$$

Where, I=Cell count in intake water (pre-cavitation)

D=Cell count in discharge water (post-cavitation)

The biological count with regard to viable bacteria, associated with zooplankton, is assessed in the intake and discharge waters using spread plate method. Zooplankton cells are collected by passing known quantity of intake (pre-cavitation) and discharge (post-cavitation) waters through a sieve made up of bolting silk with 50μ mesh and suspended in a known quantity of filtered seawater. The zooplankton cells are then homogenized and an aliquot of this homogenate (0.1 ml) after serial dilutions is plated on Zobell marine agar and incubated for 24 hours at ambient temperature. The colonies are enumerated thereafter and expressed as number per milliliter. The bacterial count in discharge water (post-cavitation) is compared with the intake water (pre-cavitation) and the percentage reduction in bacterial number is calculated as above.

The biological count with regard to phytoplankton of cell size greater than 10μ is assessed in the intake (pre-cavitation condition) and discharge (post-cavitation condition) waters. For this purpose a known volume of intake water and discharge water is filtered through a sieve made up of bolting silk with 10μ mesh. The phytoplankton cells retained on the 10μ bolting silk are then immediately transferred into a known volume of filtered seawater. A sub sample of known volume is taken after thorough mixing and only pigmented cells with red chlorophyll fluorescence under UV light are enumerated using an inverted epifluorescence microscope and expressed as numbers per milliliter. The phytoplankton count in discharge water is compared with intake water and the percentage reduction in number is calculated as above.

The biological count with regard to Zooplankton of size greater than 50μ is assessed in the intake (pre-cavitation condition) and discharge (post-cavitation condition) waters. For this purpose a known volume of intake water and discharge water is filtered through a sieve made up of bolting silk with 50μ mesh. The Zooplankton cells retained on the sieve are then immediately transferred into a known volume of filtered seawater. A sub sample of known volume is taken after thorough mixing and only live zooplanktons (with mobility) are enumerated using a binocular microscope and expressed as numbers per cubic meter. The zooplankton count in discharge water is compared with intake water and the percentage reduction in number is calculated as above.

The following examples are given by way of illustration of the apparatus for disinfection of sea water/ship's ballast water and a method thereof of the present invention in actual practice and therefore should not be construed to limit the scope of the present invention in any manner.

EXAMPLE-1

Flow through cavitation element 1 having single hole, non-circular shape, with sharp edge orifice plate (after drilling the holes in the plate, the edges of the holes were not bevelled or smoothened or polished) of size 21.5 mm; fraction of open area=0.9, flow rate=2.8 lps corresponding to the liquid velocity through the cavitating element of 7.7 m/s and pressure=3 kg/cm$^2$. The seawater along with the biota was passed through the orifice once. The % destruction as indicated in the following table is with reference to the inlet water.

| S. No | Type of organisms | cell count in intake water (pre-cavitation) | cell count in discharge water (post-cavitation) | reduction of cell count (%) |
|---|---|---|---|---|
| 1 | Zooplankton (>50μ size) | 107800/m$^3$ | 77439/m$^3$ | 28 |
| 2 | Phytoplankton (>10μ size) | 148/ml | 109/ml | 26 |
| 3 | Bacteria (Free living) | 4.86 × 10$^5$/ml | 5.00 × 10$^5$/ml | 0 |

EXAMPLE-2

Flow through cavitation element 2 having single hole, non-circular shape, with sharp edge orifice plate (after drilling the holes in the plate, the edges of the holes were not bevelled or smoothened or polished) of size 21.5 mm; fraction of open area=0.5, flow rate=1.9 lps, corresponding to the liquid velocity through the cavitating element of 10.5 m/s and pressure=3.8 kg/cm$^2$. The seawater along with the biota was passed through the orifice once. The % destruction as indicated in the following table is with reference to the inlet water.

| S. No | Type of organisms | cell count in intake water (pre-cavitation) | cell count in discharge water (post-cavitation) | reduction of cell count (%) |
|---|---|---|---|---|
| 1 | Zooplankton (>50μ size) | 107800/m$^3$ | 72000/m$^3$ | 33 |
| 2 | Phytoplankton (>10μ size) | 148/ml | 80/ml | 46 |
| 3 | Bacteria (Free living) | 4.86 × 10$^5$/ml | 4.32 × 10$^5$/ml | 11 |

EXAMPLE-3

Flow through cavitation element 3 having single hole, non-circular shape, with sharp edge orifice plate (after drilling the holes in the plate, the edges of the holes were not bevelled or smoothened or polished) of size 21.5 mm; fraction of open area=0.25, flow rate=1.0 lps, corresponding to the liquid velocity through the cavitating element of 11 m/s and pressure=3.8 kg/cm$^2$. The seawater along with the biota was passed through the orifice once. The % destruction as indicated in the following table is with reference to the inlet water.

| S. No | Type of organisms | cell count in intake water (pre-cavitation) | cell count in discharge water (post-cavitation) | reduction of cell count (%) |
|---|---|---|---|---|
| 1 | Zooplankton (>50μ size) | 107800/m$^3$ | 46000/m$^3$ | 57 |
| 2 | Phytoplankton (>10μ size) | 148/ml | 112/ml | 24 |
| 3 | Bacteria (Free living) | 4.86 × 10$^5$/ml | 2.76 × 10$^5$/ml | 43 |

EXAMPLE-4

Flow through cavitation element 4 having multiple holes sharp edge orifice plate (after drilling the holes in the plate, the edges of the holes were not bevelled or smoothened or polished) of size 21.5 mm having circular hole of diameter 2 mm; fraction of open area=0.25, flow rate=0.8 lps corresponding to the liquid velocity through the cavitating element of 8.8 m/s and pressure=3.8 kg/cm$^2$. The seawater along with the biota was passed through the orifice once. The % destruction as indicated in the following table is with reference to the inlet water.

| S. No | Type of organisms | cell count in intake water (pre-cavitation) | cell count in discharge water (post-cavitation) | reduction of cell count (%) |
|---|---|---|---|---|
| 1 | Zooplankton (>50μ size) | 140000/m$^3$ | 29244/m$^3$ | 79 |
| 2 | Phytoplankton (>10μ size) | 341/ml | 320/ml | 6 |
| 3 | Bacteria (Associated with zooplankton) | 66 × 10$^4$/ml | 29 × 10$^4$/ml | 56 |

EXAMPLE-5

Flow through cavitation element 5 having multiple holes sharp edge orifice plate (after drilling of the holes in the plate the holes were not beveled or smoothened or polished) of size 21.5 mm having circular hole of diameter 2 mm; fraction of open area=0.5, flow rate=1.7 lps corresponding to the liquid velocity through the cavitating element of 9.4 m/s and pressure=3.3 kg/cm$^2$. The seawater along with the biota was passed through the orifice once. The % destruction as indicated in the following table is with reference to the inlet water.

| S. No | Type of organisms | cell count in intake water (pre-cavitation) | cell count in discharge water (post-cavitation) | reduction of cell count (%) |
|---|---|---|---|---|
| 1 | Zooplankton (>50μ size) | 140000/m$^3$ | 29377/m$^3$ | 79 |
| 2 | Phytoplankton (>10μ size) | 341/ml | 221/ml | 35 |
| 3 | Bacteria (Associated with zooplankton) | 66 × 10$^4$/ml | 5 × 10$^4$/ml | 92 |

EXAMPLE-6

Flow through cavitation element 6 having multiple holes sharp edge orifice (after drilling of the holes the holes were not beveled or smoothened or polished) plate of size 21.5 mm having circular hole of diameter 2 mm; fraction of open area=0.75, flow rate=1.3 lps corresponding to the liquid velocity through the cavitating element of 4.8 m/s and pressure=3.2 kg/cm$^2$. The seawater along with the biota was passed through the orifice once. The % destruction as indicated in the following table is with reference to the inlet water.

| S. No | Type of organisms | cell count in intake water (pre-cavitation) | cell count in discharge water (post-cavitation) | reduction of cell count (%) |
|---|---|---|---|---|
| 1 | Zooplankton (>50μ size) | 140000/m$^3$ | 26144/m$^3$ | 81 |
| 2 | Phytoplankton (>10μ size) | 341/ml | 300/ml | 12 |
| 3 | Bacteria (Associated with zooplankton) | 66 × 10$^4$/ml | 0.5 × 10$^4$/ml | 99 |

EXAMPLE-7

Flow through cavitation element 7 having multiple holes sharp edge orifice plate (after drilling of the holes the holes were not beveled or smoothened or polished) of size 21.5 mm having circular hole of diameter 1 mm; fraction of open area=0.25. The seawater along with the biota was passed through the orifice for variable flow conditions. The results are given in the table below:

| Flow conditions | | | Bacterial cell | reduction |
|---|---|---|---|---|
| Re-circulation time (minutes) | Flow velocity (m/s) | Discharge pressure (kg/cm$^2$) | count (Free living) (No./ml) | of cell count (%) |
| 0 | 0 | 0 | 16000 | — |
| 15 | 15.8 | 2 | 8000 | 50 |
| 30 | 18.9 | 3 | 2400 | 85 |
| 45 | 21.6 | 4 | 0 | 100 |

EXAMPLE-8

In order to illustrate the methodology depicted in FIG. 4 of the drawings, an example of computational fluid dynamics (CFD) modeling of flow through cavitating chamber is presented here. This example constitutes some steps depicted in the proposed methodology as shown in FIG. 4 of the drawings. For this experiment, a flow through cavitating element of size 32 mm having 8 holes of diameter 2 mm was considered. Several different cavitating elements with circular, triangular, square and rectangular holes (as shown in FIG. 3 of the drawings) were considered. Sample of predicted results is as shown in FIG. 5(*a*) of the drawings. The results of the CFD model were used to simulate trajectories of generated cavities, as shown in FIG. 5(*b*) of the drawings. The pressure history data along these cavity trajectories were used to calculate cavity collapse temperature and cavity collapse pressure, as shown in FIG. 5(*c*) of the drawings. The cavity radius history and the final collapse pressure pulse was estimated by the solution of the R.P equation after substituting the pressure variation experienced by the traveling cavity based on it's trajectory (predicted by CFD simulations) and the pressure profiles generated by substituting for P infinity in the R.P. equation. The computational models were then used to evaluate effectiveness and efficiency of different cavitating elements for generating cavities. A sample of results is shown in FIG. 5(*d*) of the drawings.

From the results of biological counts obtained under various operational conditions as given in the illustrative examples herein above it is clear that there is a substantial destruction of organisms. This observed destruction occurred without requiring any chemicals or heat treatment or the use of UV or ultrasound treatment. The disinfection performance can be significantly enhanced by employing the optimization methodology discussed above and illustrated in FIG. 4 of the drawings. By employing such a methodology the apparatus of ballast water disinfection can be tailored to destruction of specific micro-organisms as well. The aforementioned patents and other water treatment systems and methods currently known in the art make no provisions as in the present invention for the disinfection/treatment of ballast water using hydrodynamic cavitation wherein the apparatus is essentially a cavitating chamber incorporating single or multiple cavitating elements, spaced at uniform or non-uniform spacing and each said cavitating element having a fractional open area in the form of single or multiple orifices which are either be circular or non-circular and either with or without sharp edges.

In view of the foregoing disadvantages inherent in the known types of ballast water treatment systems and methods now present in the prior art, the present invention provides an apparatus and method to treat ballast water using hydrodynamic cavitation in which ballast water is passed through a cavitating chamber having a single or multiple cavitating elements to facilitate disinfection of the ballast water and overcomes the disadvantages and drawbacks noted in the prior art. Further, the present invention provides an apparatus for disinfection of sea water/ship's ballast water and a method thereof, which has all the advantages of the prior art mentioned heretofore and many novel features that result in a system and method for ballast water treatment which is not anticipated, rendered obvious, suggested, or even implied by the prior art, either alone or in any combination thereof The main advantages of the present invention are:
1. The disinfection of seawater/ballast water is achieved by simply passing the organism infested water through a single or multiple cavitation chambers put in-line of intake or discharge pipe.
2. Does not involve use of any chemicals or any chemical reaction.
3. Is simple, eco-friendly and can be fitted on to existing intake and discharge systems of any ship with minor modifications.
4. It requires no or minimum additional space depending on the type of ship and its ballasting and de-ballasting system.
5. Poses no risk to the health of the ship's crew unlike chemical methods and requires no special skill or additional manpower for its operation.
6. Enables efficient and economical disinfection of ballast water, to limit the environmentally adverse effects that may result when the untreated water is released into an environment that is ecologically different from that in which the water was originally obtained.
7. Disinfects ballast water by effectively killing aquatic organisms.

8. Relatively low cost of manufacture with regard to both materials and labor, and which accordingly is then capable of relatively low prices of sale to the consuming public and industries.
9. The apparatus and method can be used in conjunction with any other treatment system(s) for achieving desired efficiency.

As such, those skilled in the art will appreciate that the concept, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

We claim:

1. An apparatus for disinfection of sea water/ship's ballast water, which comprises a water intake means consisting of a ballast water intake source and a pump means connected in series through a pressure gauge and check valve(s) to an inlet port of a cavitation chamber, optionally through a heat exchanger, characterized in that the said cavitation chamber essentially being provided with single or multiple cavitating elements placed perpendicular to the direction of flow of fluid, said cavitating elements being spaced at uniform or non-uniform spacing and each said cavitating element having a fractional open area in the form of single or multiple orifices, the output of the said cavitation chamber being passed through a quality check point and check valve(s) to a ballast tank, the output of the said ballast tank being connected to a discharge pump through check valve(s) to a discharge outlet.

2. The apparatus as claimed in claim 1, wherein the cavitation chamber has water intake means through which seawater enters from outside a vessel.

3. The apparatus as claimed in claim 1, wherein the pump means is one or a series of pumps such as, but not limited to a ballast pump.

4. The apparatus as claimed in claim 1, wherein the heat exchanger is connected to an energy source such as a standard source or method known in the art, or steam or engine exhaust gases from the ships engine.

5. The apparatus as claimed in claim 1, wherein the cavitating chamber is of cross section such as circular or non circular shape.

6. The apparatus as claimed in claim 1, wherein the cavitating chamber houses a single or multiple cavitating element(s) in the form of plates such as of metallic, ceramic, plastic materials of varying thicknesses placed perpendicular to the direction of flow of liquid in series or in parallel and positioned at uniform or non-uniform spacing mounted therein and held in place by means such as flanges.

7. The apparatus according to claim 1, wherein the spacing between subsequent cavitating elements is in the range of 4 to 100 times the holding chamber diameter, spaced at uniform or non-uniform spacing.

8. The apparatus as claimed in claim 1, wherein the cavitating element is having a fraction of open area in the range of 0.01 to 0.90 times the holding chamber cross sectional flow area.

9. The apparatus as claimed in claim 1, wherein the cavitating element(s) having a fractional open area in the form of single or multiple orifices are either circular or non-circular with or without sharp edges, wherein each hole is having a diameter in the range of 500 micrometers to few millimeters.

10. The apparatus as claimed in claim 1, wherein (i) the diameter of cavitation chamber; (ii) the number of cavitation elements; (iii) the spacing between cavitation elements; (iv) the fractional open area and number, diameter and distribution of orifices on each cavitation element; (v) the operating temperature; (vi) the operating flow rate/flow velocity; (vii) the number of re-circulations through cavitation chamber; are estimated and configured using computational fluid dynamics (CFD) based models and Rayleigh-Plesset equation for cavitation collapse, such as herein described.

11. The apparatus as claimed in claim 1, wherein quality check point is provided with known devices capable of monitoring the quality of treated water.

12. The apparatus as claimed in claim 1, wherein to enable re-circulation of the treated water or a portion thereof if required by the quality check point, the discharge outlet of the said discharge pump being connected through a pressure gauge and check valve(s), optionally through a heat exchanger, to an inlet port of a cavitation chamber having single or multiple cavitating elements and back to the said ballast tank through a quality check point and check valves.

13. A method for disinfection of sea water/ship's ballast water using the apparatus as claimed in claim 1, said method comprising subjecting the ballast water to be treated to hydrodynamic cavitation by pumping the water intake of sea water, optionally pre-heated, into an inlet port of a cavitation chamber having single or multiple cavitating elements, the treated ballast water being passed through a quality check point to a ballast tank, re-circulating the treated water or a portion thereof if required by the quality check, for further hydrodynamic cavitation.

14. The method as claimed in claim 13, wherein the ballast water to be treated is optionally pre-heated to a temperature in the range of 10 to 70° C.

15. The method as claimed in claim 13, wherein the water flow rate through the cavitating element is such that the liquid velocities are in the range of 2 to 150 m/s.

16. The method as claimed in claim 13, wherein the water pressure is in the range of 0.5 to 150 kg/cm$^2$.

17. The method as claimed in claim 13, wherein the method for disinfection treatment of water using hydrodynamic cavitation is also suitable for a wide variety of water treatment applications including but not limited to wastewater management, agricultural applications, pool and space applications, oil and gas applications, and various disinfectant applications

* * * * *